(12) United States Patent
Lin et al.

(10) Patent No.: US 6,990,147 B2
(45) Date of Patent: *Jan. 24, 2006

(54) GENERATING A NON-PROGRESSIVE DUMMY BIDIRECTIONAL PREDICTIVE PICTURE

(75) Inventors: Shu Lin, Indianapolis, IN (US); Donald Henry Willis, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 603 days.

This patent is subject to a terminal disclaimer.

(21) Appl. No.: 10/158,687

(22) Filed: May 30, 2002

(65) Prior Publication Data

US 2003/0147467 A1 Aug. 7, 2003

Related U.S. Application Data

(60) Provisional application No. 60/334,914, filed on Oct. 23, 2001.

(51) Int. Cl.
*H04N 7/12* (2006.01)

(52) U.S. Cl. ................................ 375/240.15
(58) Field of Classification Search ........... 375/240.15, 375/240.02, 240.12, 240.13, 240.2; 386/68, 386/111, 112; H04N 7/12
See application file for complete search history.

(56) References Cited

U.S. PATENT DOCUMENTS

| | | | |
|---|---|---|---|
| 5,228,028 A | | 7/1993 | Cucchi et al. |
| 5,394,196 A | | 2/1995 | Robert |
| 5,739,862 A | * | 4/1998 | Cen ...................... 375/240.15 |
| 5,793,894 A | | 8/1998 | Sugiyama |
| 5,822,541 A | * | 10/1998 | Nonomura et al. .......... 709/247 |
| 5,912,709 A | * | 6/1999 | Takahashi .............. 375/240.15 |
| 5,956,088 A | * | 9/1999 | Shen et al. ............. 375/240.25 |
| 5,978,543 A | * | 11/1999 | Nishimura et al. ......... 386/109 |
| 5,987,179 A | * | 11/1999 | Riek et al. .................. 382/236 |
| 6,081,211 A | * | 6/2000 | de Queiroz et al. .......... 341/65 |
| 6,167,157 A | * | 12/2000 | Sugahara ..................... 382/236 |
| 6,192,186 B1 | * | 2/2001 | Murashima et al. .......... 386/68 |
| 6,748,020 B1 | * | 6/2004 | Eifrig et al. ........... 375/240.26 |
| 6,865,747 B1 | * | 3/2005 | Mercier ....................... 725/94 |

* cited by examiner

*Primary Examiner*—Nhon Diep
(74) *Attorney, Agent, or Firm*—Joseph S. Tripoli; Joseph J. Laks; Jorge Tony Villabon

(57) ABSTRACT

The invention concerns a method (200) and system (100) for generating a dummy bidirectional predictive picture which can be repeated during display with substantially no vibration in which the dummy bidirectional predictive picture contains at least two fields. The method includes the steps of setting (220) a parameter of the dummy bidirectional predictive picture to indicate that no encoding of a residual signal will occur and employing (216, 222, 224) field-based prediction to predict the at least two fields of the dummy bidirectional predictive picture. The setting step can further include setting the parameter of the dummy bidirectional predictive picture to indicate that no discrete cosine transform encoding of the residual signal will occur. The dummy bidirectional predictive picture can include a plurality of macroblocks, and each macroblock can contain at least a portion of the at least two fields and the parameter can be a macroblock parameter.

36 Claims, 3 Drawing Sheets

GENERATING A NON-PROGRESSIVE DUMMY BIDIRECTIONAL PREDICTIVE PICTURE

CROSS REFERENCE TO RELATED APPLICATIONS

This is a non-provisional application of provisional application Ser. No. 60/334,914 filed Oct. 23, 2001.

STATEMENT REGARDING FEDERALLY SPONSORED RESEARCH OR DEVELOPMENT (Not Applicable)

BACKGROUND OF THE INVENTION

1. Technical Field

The inventive arrangements relate generally to video systems and more particularly to video systems that record or play back digitally encoded video sequences.

2. Description of Related Art

Digital televisions (DTV) and high-definition televisions (HDTV) are gaining popularity in today's consumer electronics marketplace. Many purchasers of these types of televisions also buy digital video recorders or players, such as digital video disc (DVD) recorders or players, for purposes of viewing previously recorded programs or recording their favorite programs. Notably, the combination of a DTV (or an HDTV) and a digital video recorder or player can be an integral part of a home theater entertainment system.

A digital video recorder or player typically contains a Moving Pictures Expert Group (MPEG) decoder to decode the digitally encoded multimedia data that is stored on the discs that the recorder or player plays. If the digital video recorder or player is connected to a conventional (non-DTV or non-HDTV) television, the digitally encoded signal will be decoded by the digital video recorder or player's MPEG decoder before being displayed on the conventional television. Significantly, however, many DTV's contain their own MPEG decoders. As such, if a digital video recorder or player is connected to a DTV, the video signal read from the disc is remotely decoded by the DTV's decoder. This configuration can be referred to as a remote decoder arrangement.

There is, however, an important disadvantage to decoding digitally encoded signals with a remote DTV decoder. Namely, it is very difficult to perform trick modes in this type of arrangement. A trick mode can be any playback of video in which the playback is not done at normal speed or in a forward direction. Oftentimes, a trick mode involves repeating a number of pictures in a video signal such as during a slow motion or freeze trick mode. As the bandwidth between the digital video recorder or player and the DTV is limited, repeating pictures in the signal being fed to the DTV may cause the signal to exceed the maximum bit rate limit of the transmission channel. The problem is even more acute if the pictures are intra (I) pictures or predictive (P) pictures, as these pictures may be encoded with a relatively large number of bits.

Moreover, even the process of skipping pictures, such as the case during a fast motion trick mode, can cause the average bit rate of a video signal to exceed the bit rate. Specifically, the first pictures in a group of pictures (GOP) to be skipped in a fast motion trick mode are typically the bidirectional predictive (B) pictures. As the B pictures are skipped, the average amount of encoded data for the remaining pictures, or the average number of bits per picture, in the GOP increases. Exceeding the bit rate limit of a transmission channel can lead to buffer overflow and the loss of pictures during the display of the trick mode video signal.

In addition to the bit rate problem, there is another disadvantage to decoding video signals remotely: the repeated display of non-progressive pictures in such an arrangement can cause a vibration effect to appear in the display if the repeated pictures contain a moving object. To explain this drawback, a brief explanation of interlaced scanning is warranted.

Many televisions employ the interlaced scanning technique. Under this format, the video signal is typically divided into a predetermined number of horizontal lines. During each field period, only one-half of these lines are scanned; generally, the odd-numbered lines are scanned during the first field period, and the even-numbered lines are scanned during the next field period. Each sweep is referred to as a field, and when combined, the two fields form a complete picture or frame. For an NTSC system, sixty fields are displayed per second, resulting in a rate of thirty frames per second.

As a moving object moves across the screen in an interlaced scanning television, each field will only display a portion of the moving object. This partial display is because a field only displays every other horizontal line of the overall picture. For example, for a particular field n, only the odd-numbered horizontal lines are scanned, and the portion of the moving object that will be displayed in field n is the portion that is scanned during the odd-numbered horizontal line sweep for field n. The next field, field n+1, is created 1/60 of a second later and will display the even-numbered horizontal lines of the picture. Thus, the portion of the moving object that is displayed in field n+1 is the portion that is scanned during the even-numbered horizontal line sweep for field n+1. Although each field is temporally distinct, the human eye perceives the sequential display of the fields as smooth motion due to the speed at which the fields are displayed.

If a viewer activates a trick mode, the trick mode video signal may contain repeated pictures, pictures that were recorded under the interlaced scanning format. For example, if the viewer initiates a freeze trick mode on a particular picture, then that picture can be repeatedly transmitted to and decoded and displayed at the DTV containing the remote decoder. The display of the repeated picture, however, is in accordance with the normal display of a non-progressive picture, i.e, the fields that make up the non-progressive picture are alternately displayed.

As noted earlier, if a moving object appears in the pictures recorded under the interlaced scanning format, each field will display the moving object in one specific position. Thus, as these fields are alternately displayed during the freeze trick mode, the moving object in the display rapidly moves from one position in the display to another; in effect, the moving object appears to vibrate. This vibration is created because the interlaced fields are temporally distinct, and the moving object appears in a different position for each field.

This problem is also present in DTVs that include a deinterlacer. As is known in the art, a deinterlacer can construct complete frames from an interlaced field. Thus, a deinterlacer can construct complete frames out of the fields that comprise the repeated non-progressive frame. Nevertheless, these complete frames constructed from the interlaced fields will also be displayed in an alternate fashion thereby creating the possibility of the vibration artifact. In addition, this vibration effect appears in not only a freeze trick mode but may also be present in any other trick mode in which non-progressive pictures are repeated. Thus, it is desirable to eliminate the bit rate problem and the vibration artifact without increasing system costs or complexity.

SUMMARY OF THE INVENTION

The present invention concerns a method of generating a dummy bidirectional (B) predictive picture which can be repeated during display with substantially no vibration, wherein the dummy bidirectional predictive picture contains at least two fields. The method includes the steps of setting a parameter of the dummy bidirectional predictive picture to indicate that no encoding of a residual signal will occur and employing field-based prediction to predict the at least two fields of the dummy bidirectional predictive picture. In one arrangement, the setting step can further include setting the parameter of the dummy bidirectional predictive picture to indicate that no discrete cosine transform encoding of the residual signal will occur.

In another arrangement, the dummy bidirectional predictive picture can include a plurality of macroblocks, and each macroblock can contain at least a portion of the at least two fields and the parameter can be a macroblock parameter. Each macroblock can contain at least two motion vectors having horizontal and vertical motion components, and the method can further include the step of setting the at least two motion vectors of each macroblock to indicate that the horizontal and vertical motion components will be zero.

In one aspect of the invention, the dummy bidirectional predictive picture can be a one-directional prediction picture. In addition, the employing field-based prediction step can include the step of predicting the at least two fields of the dummy bidirectional predictive picture from a single field associated with a separate digitally encoded non-progressive picture. Moreover, the dummy bidirectional predictive picture can be a forward predicted or backward predicted picture. The separate digitally encoded non-progressive picture can be an intra picture or a predictive picture. In another aspect, the dummy bidirectional predictive picture can be a two directional predicted picture such that a first field of the dummy bidirectional predictive picture can be predicted from a first reference picture and a second field of the dummy bidirectional predictive picture can be predicted from a second reference picture. Additionally, the first field of the dummy bidirectional predictive picture can be predicted from a single field associated with the first reference picture, and the second field of the dummy bidirectional predictive picture can be predicted from a single field associated with the second reference picture. The dummy bidirectional predictive picture can be predicted from a non-progressive picture, a progressive picture or a field picture.

The present invention also concerns a system for generating a dummy bidirectional predictive picture from a non-progressive picture in which the dummy bidirectional predictive picture contains at least two fields. The system includes a controller for reading data from a storage medium and a processor in which the processor is programmed to set a parameter of the dummy bidirectional predictive picture to indicate that no encoding of a residual signal will occur and employ field-based prediction to predict the at least two fields of the dummy bidirectional predictive picture. The system also includes suitable software and circuitry to implement the methods as described above.

DETAILED DESCRIPTION OF THE PREFERRED EMBODIMENTS

Figure 1:
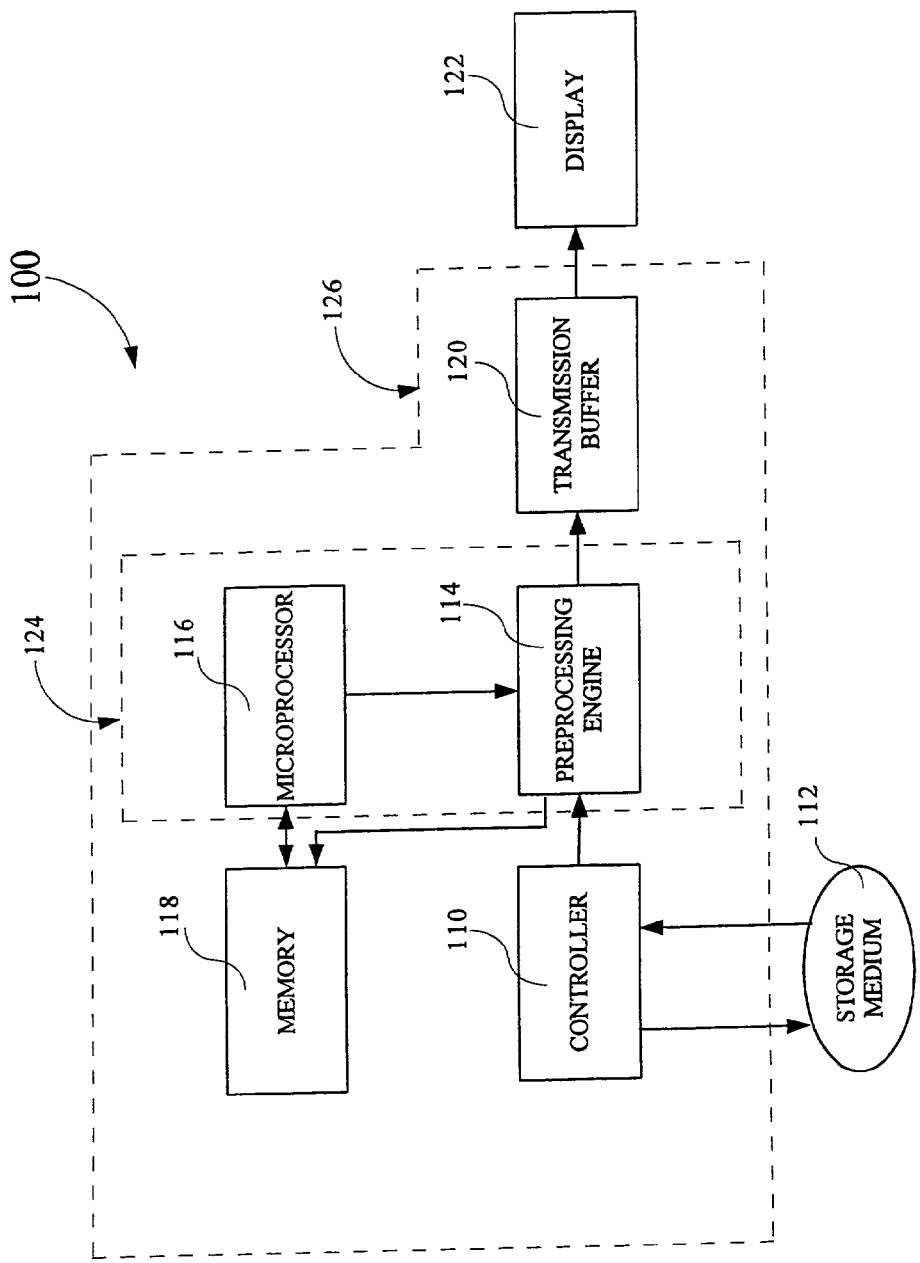
FIG. 1 is a block diagram of a system that can generate a dummy bidirectional predictive picture from a non-progressive picture in accordance with the inventive arrangements herein.

A system 100 for implementing the various advanced operating features in accordance with the inventive arrangements is shown in block diagram form in FIG. 1. The invention, however, is not limited to the particular system illustrated in FIG. 1, as the invention can be practiced with any other system capable of receiving a digitally encoded signal and transferring that signal to a display device. In addition, the system 100 is not limited to reading data from or writing data to any particular type of storage medium, as any storage medium capable of storing digitally encoded data can be used with the system 100.

The system 100 can include a controller 110 for reading data from and writing data to a storage medium 112. The system 100 can also have a preprocessing engine 114, a microprocessor 116, memory 118, a transmission buffer 120 and a display device 122. The preprocessing engine 114 can contain suitable software and circuitry for locating and setting or adjusting one or more particular flags or parameters in the digitally encoded video signal for purposes of generating dummy B pictures. Control and data interfaces can also be provided for permitting the microprocessor 116 to control the operation of the controller 110 and the preprocessing engine 114. Suitable software or firmware can be provided in memory for the conventional operations performed by the microprocessor 116. Further, program routines can be provided for the microprocessor 116 in accordance with the inventive arrangements.

It should be understood that all or portions of the preprocessing engine 114 and the microprocessor 116 can be a processor 124 within contemplation of the present invention. Further, all or portions of the controller 110, the preprocessing engine 114, the microprocessor 116 and the transmission buffer 120 can be a bitstream source 126 within contemplation of the present invention.

In one arrangement, the display device 122 can contain its own decoder (not pictured) for decoding all or a portion of any video signal read from the storage medium 112 and processed by the bitstream source 126. In this particular arrangement, the decoder (not shown) in the bitstream source 126 typically does not decode the video signal read from the storage medium 112. This particular embodiment can be referred to as a remote decoder arrangement. It should be noted, however, that the invention is not limited to this arrangement, as the invention can be practiced in any other suitable system.

In operation, the controller 110 can read a video signal containing a plurality of pictures from the storage medium 112. These pictures can be non-progressive pictures, progressive pictures or field pictures. In one arrangement, if the microprocessor 116 receives a trick mode command, then the microprocessor 116 can signal the preprocessing engine 114 to generate dummy B pictures that can be predicted from the pictures in the digitally encoded video signal by locating and setting or adjusting several predetermined flags and parameters of the, for example, MPEG syntax of these pictures. The dummy B pictures can then be transferred to the transmission buffer 120 and on to the display device 122. The dummy B pictures can be decoded and displayed at the display device 122.

The above discussion is an example of how the dummy B pictures can be generated once the microprocessor 116 receives a trick mode command. Such a process is referred to as generating dummy B pictures "on the fly." Alternatively, however, the preprocessing engine 114 and the microprocessor 116 can generate dummy B pictures prior to the initiation of a trick mode command. As an example, the dummy B pictures can be generated, and the microprocessor 116 can instruct the preprocessing engine 114 to transfer one or more of the dummy B pictures to memory 118. At memory 118, the dummy B pictures can be stored until a trick mode command is received, at which time the microprocessor 116 can insert the dummy B pictures into the video signal. The overall operation of the invention will be discussed in greater detail below.

Generating a Non-progressive Dummy
Bidirectional Predictive Picture

Figure 2:
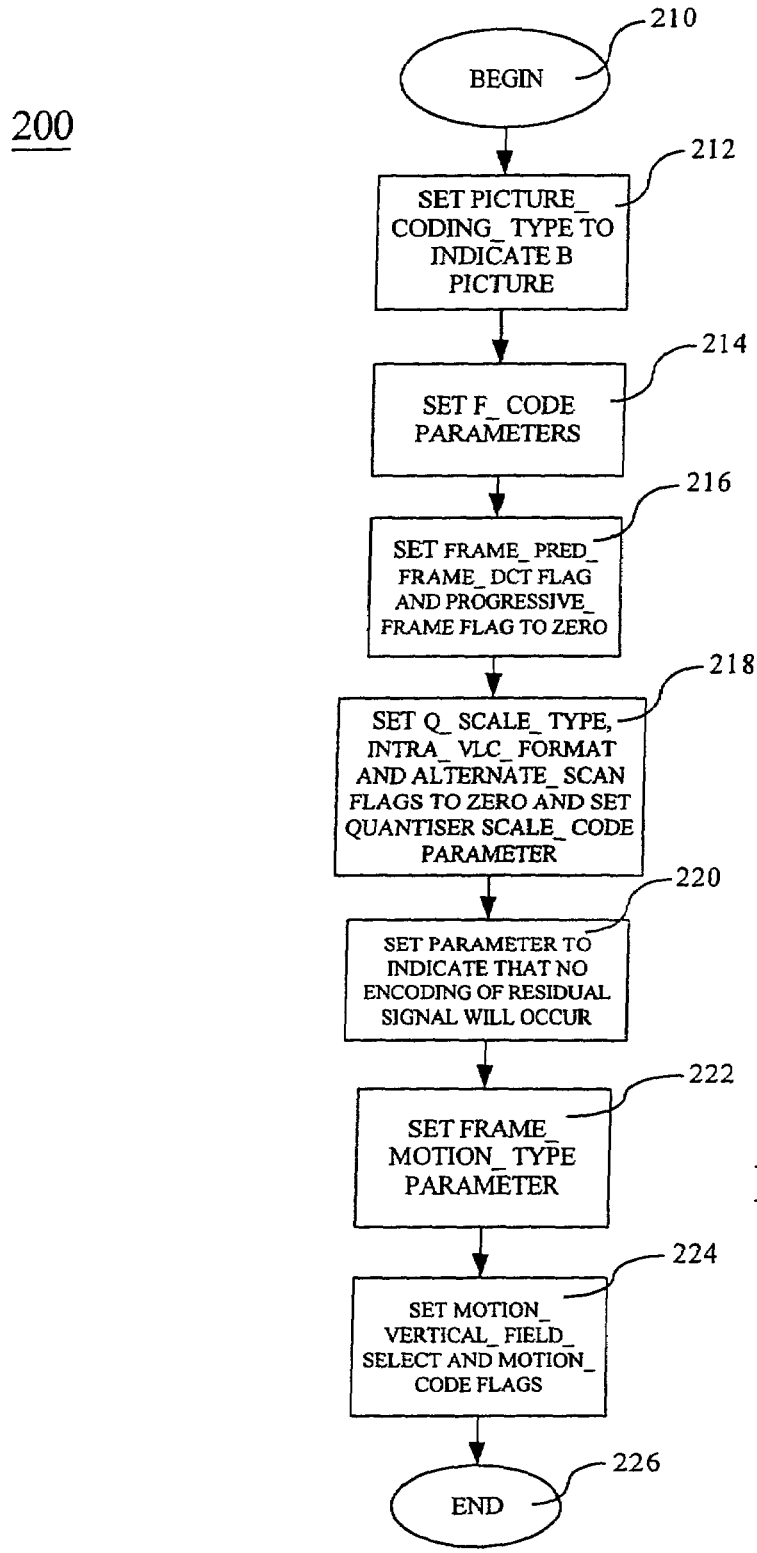
FIG. 2 is a flow chart that illustrates an operation of generating a dummy bidirectional predictive picture from a non-progressive picture in accordance with the inventive arrangements.

FIG. 2 illustrates a method 200 that demonstrates one way in which a dummy B picture can be generated. The dummy B picture can be a non-progressive picture having at least two fields. In one embodiment, the invention can be practiced in a remote decoder arrangement. For purposes of the invention, a remote decoder arrangement can be any system in which at least a portion of the pictures in a video signal can be decoded by a decoder that is external to and not under the control of a bitstream source that is providing the pictures to the decoder. As an example, the bitstream source can be an optical storage medium player or recorder that reads multimedia data from an optical storage medium and transfers this data over a transmission channel to a digital television, which contains its own decoder. It is understood, however, that the invention is not limited to this example or even a remote decoder arrangement, as the invention can be practiced in any other suitable system or arrangement.

Figure 3:
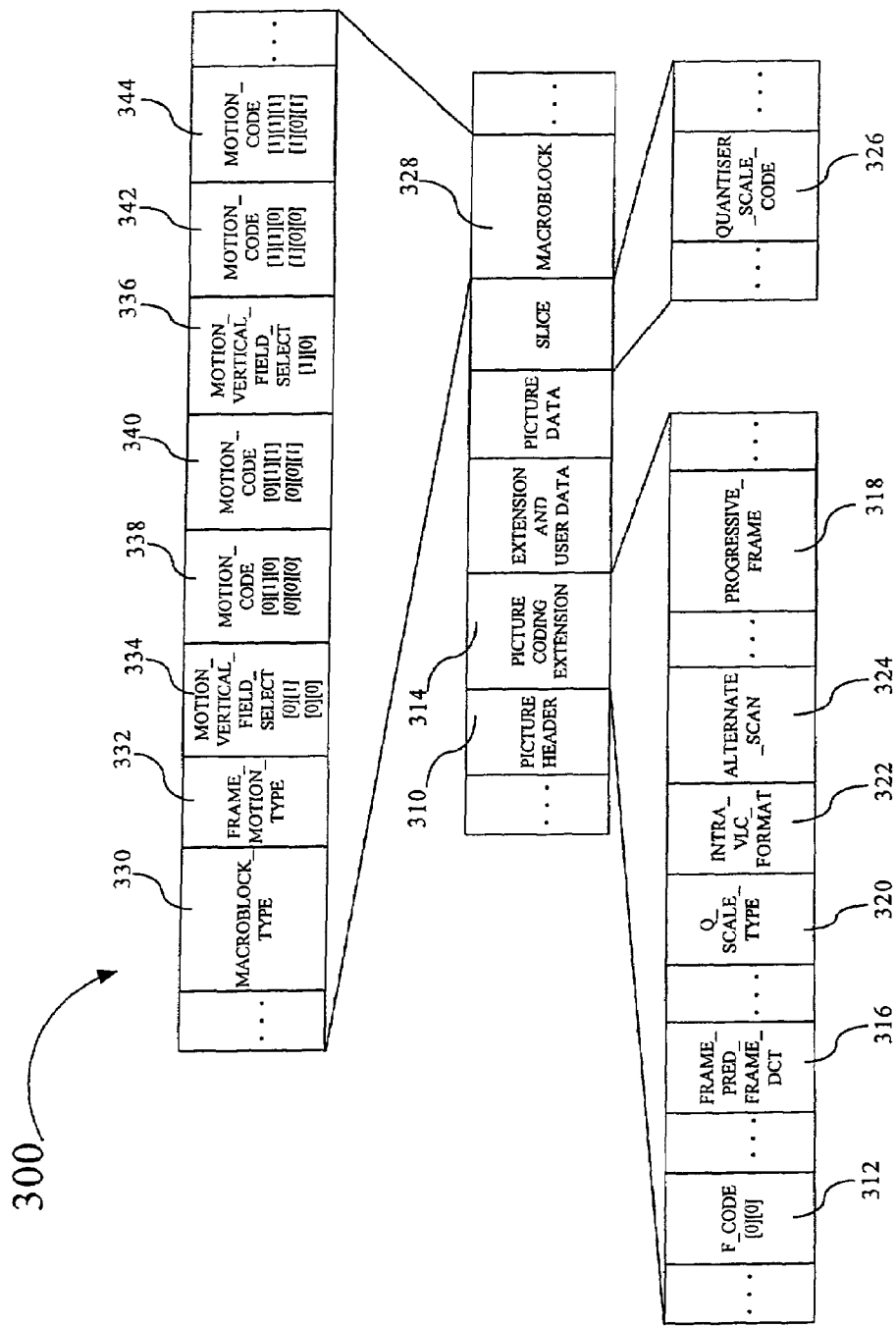
FIG. 3 is an illustration of certain portions of a typical MPEG syntax.

Referring to FIG. 3, a portion of a typical MPEG syntax 300 of a digitally encoded picture is shown. This syntax 300 can represent the syntax of a dummy B picture in accordance with the inventive arrangements. FIG. 3 will be discussed in conjunction with FIG. 2 for purposes of describing how a dummy B picture can be generated from a non-progressive picture. It should be noted that only those portions of the syntax 300 that are relevant to the generation of dummy B pictures from non-progressive frames, in particular dummy B pictures that can reduce the vibrating pictures artifact, will be discussed. Those of skill in the art will appreciate that the portions of the syntax 300 that are not discussed here are already known through the use of conventional B pictures.

Referring back to FIG. 2, at step 210, the process for generating dummy B pictures from non-progressive pictures can begin. At step 212, a picture_coding_type parameter contained in a picture header 310 of the syntax 300 can be set to indicate that the dummy B picture will be a B picture. Preferably, the picture_coding-type_parameter is a three bit parameter, and the value can be set to "011." At step 214, f-code parameters can be set. In FIG. 3, the f_code parameters 312, typically including four bit parameters f_code[0][0], f_code[0][1], f_code[1][0] and f_code[1][1], are located in a picture coding extension header 314.

In one arrangement, the dummy B picture can be a one-directional prediction picture. A one-directional prediction picture is predicted from merely one picture, whereas a B picture is generally predicted from two separate pictures. Typically, the one-directional dummy B pictures can either be forward predicted dummy B pictures or backward predicted dummy B pictures. If the dummy B picture is a forward predicted dummy B picture, then the dummy B picture can be predicted from a reference picture that is before (in display order) the dummy B picture. In contrast, if the dummy B picture is a backward predicted dummy B picture, then the dummy B picture can be predicted from a reference picture that follows (in display order) the dummy B picture. Because they are predicted merely from one picture, one-directional prediction dummy B pictures can be suitable for repeating or duplicating pictures.

If the dummy B picture is a backward predicted picture, then f_code[0][0] and f_code[0][1] can be set to a value of "1111" to indicate that no forward prediction is to occur. In addition, f_code[1][0] and f_code[1][1] can be set to reflect the motion vector range value for the backward prediction. In contrast, if the dummy B picture is a forward predicted picture, then f_code[1][0] and f_code[1][1] can be set to a value of "1111" to indicate that no backward prediction will occur, and f_code[0][0] and f_code[0][1] can be set to reflect the motion vector range value for the forward prediction.

Referring back to the method 200, a frame_pred_frame_dct flag (frame_pred_frame_dct flag 316 in FIG. 3) and a progressive_frame flag (progressive_frame flag 318 in FIG.3) can be set to a value of "0," as shown at step 216. Setting the progressive_frame flag 318 to a value of "0" can cause the dummy B picture to be recognized as a non-progressive picture. Moreover, setting the frame_pred_frame_dct flag 316 to a value of "0" can cause a decoder decoding the dummy B picture to employ field-based prediction when constructing the dummy B picture.

At step 218 of the method 200, the following flags can be set to a value of "0": Q_scale_type (Q_scale_type flag 320 in FIG. 3), Intra_vlc_format (Intra_vlc_format flag 322 in FIG. 3) and Alternate_scan (Alternate_scan flag 324 in FIG. 3). These flags can be set to a value of "0" because no encoding of the prediction error or residual signal will occur. Also, a Quantiser_scale_code parameter (Quantiser_scale_code parameter 326 in FIG. 3) can be set to a value of "00101" because the residual signal will not be encoded.

Referring back to FIG. 3, as the dummy B picture can include a plurality of macroblocks, the syntax 300 can include a macroblock header 328. A macroblock_type parameter 330 can be located within the macroblock header 328. At step 220 of method 200, a parameter can be set to indicate that no encoding of the residual signal will occur. As an example, in a conventional B picture, a discrete cosine transform is typically used to encode the residual signal. Thus, in one arrangement, no DCT encoding of the residual signal of each dummy B picture will occur.

In one arrangement, the macroblock_type parameter 330 can be set to indicate that no encoding of the residual signal will occur. As an example, the macroblock_type parameter can be set to a value of "010." Additionally, the setting can indicate that the following flags (not shown) are to be set to "0": macroblock_quant; macroblock_pattern; macroblock_intra; spatial_temporal_weight_code_flag and permitted_spatial_temporal_weight_classes. In addition, this setting can indicate that the macroblock_motion_backward flag can be set to a value of "1," which is used if the dummy B picture will be backward predicted. In another example, the macroblock_type parameter 330 can be set to a value of "0010." In this example, the settings are the same as discussed above except that the macrobock_motion_forward flag can be set to a value of "1."

Referring back to FIG. 2, a frame_motion_type parameter (frame_motion_type parameter 332 in FIG. 3) can be set, as shown at step 222. In one arrangement, because the frame_pred_frame_dct flag 316 has been set to "0," the frame_motion_type parameter 332 can be set to a value of "10." This setting indicates that the prediction type is frame_based prediction, the motion_vector_count is "2," the mv_format is field and the dmv is "0."

Continuing with the method 200, at step 224, several motion_vertical_field_select flags and motion_code flags can be set. For example, referring to FIG. 3, a motion_vertical_field_select[0][1] or [0][0] flag 334 and a motion_vertical_field_select[1][0] 336 can be set to indicate which field(s) of the reference picture from which the fields that comprise the dummy B picture will be predicted. The first set of indices for flag 334 is associated with a backward predicted dummy B picture, and the second set is associated with a forward predicted dummy B picture. As an example, if the dummy B picture is a backward predicted picture, the motion_vertical_field_select[0][1] flag 334, and the motion_vertical_field_select[1][0] 336 can be set to a value of "0" to indicate that both fields of the dummy B picture will be predicted from the top field of the reference picture. Alternatively, the values of these flags can be set to "1" to indicate that the fields of the dummy B picture will be predicted from the bottom field of the reference picture. It should be noted, however, that the invention is not limited to these examples, as other field-based prediction schemes can be employed. In addition, the reference picture can be, for example, an I picture or a P picture.

Predicting the fields that comprise the dummy B picture from a single field associated with the reference picture can help eliminate the vibrating pictures artifact. This is possible because any moving object present in this single field of the reference picture will be in the same location in the fields of the dummy B picture. Thus, as these fields are alternately displayed over and over, for example, by a string of dummy B pictures, which may occur during a trick mode such as a freeze trick mode, the moving object will appear to stay in the same position, as opposed to jumping back and forth between two separate locations.

Continuing with step 224, several motion_code flags can be set. For example, in accordance with the inventive arrangements, each of the fields that make up the dummy B picture can include at least two motion vectors having horizontal and vertical motion components. As shown in FIG. 3, these motion vectors can include a motion_code[0][1][0] or [0][0][0] flag 338, a motion_code[0][1][1] or [0][0][1] flag 340, a motion_code[1][1][0] or [1][0][0] flag 342 and a motion_code[1][1][1] or [1][0][1] flag 344. The first set of indices associated with these flags concerns a backward predicted dummy B picture, and the second set is directed to a forward predicted dummy B picture. In one arrangement, each of these motion vectors can be set to a value of "1" thereby indicating that the horizontal and vertical motion components of these motion vectors will have a value of "0."

Setting the horizontal and vertical motion components to a value of "0" without encoding the residual signal helps permit the dummy B picture to include very few bits, especially when compared to I, P or even conventional B pictures. Accordingly, these pictures can be transmitted over a transmission line to a remote decoder to reduce the average bit rate of a trick mode video signal. It should be noted, however, that a dummy B picture predicted from a non-progressive frame is not limited to systems where remote decoding takes place, as these pictures can be used with any other suitable arrangement. Finally, referring back to FIG. 2, the method 200 can end at step 226.

It is understood that the invention is not limited to one directional predicted pictures. For instance, one or more of the dummy B pictures can be two directional predicted pictures. As an example, a first field of a dummy B picture can be predicted from a field associated with a first reference picture, and a second field of the dummy B picture can be predicted from a field associated with a second reference picture. This prediction scheme can be in accordance with the above discussion such that one of the fields of the dummy B picture can be either a backward or a forward predicted picture and the other field of the dummy B picture can have a prediction direction opposite that of the first field.

For example, the first field of the dummy B picture can be a forward predicted picture predicted from a first reference picture, and the second field of the dummy B picture can be a backward predicted picture predicted from a second reference picture. Predicting the dummy B pictures in such a manner provides the same advantages that using one directional predicted pictures provides, namely, lowering the bit rate and controlling the vibrating pictures problem. It is understood, however, that the invention is not limited to the foregoing example, as other prediction schemes that employ two directional predicted pictures can be used.

It is also understood that the invention is not limited to predicting non-progressive dummy B pictures from non-progressive reference pictures. As such, non-progressive dummy B pictures can be predicted from progressively scanned pictures or even field pictures in accordance with the discussion relating to FIGS. 2 and 3. Specifically, the two fields of a dummy B picture can be predicted from a single progressive reference picture or a single reference field picture. Likewise, two directional prediction schemes such as those described above can be employed using two separate progressive reference pictures or two separate reference field pictures.

Although the present invention has been described in conjunction with the embodiments disclosed herein, it should be understood that the foregoing description is intended to illustrate and not limit the scope of the invention as defined by the claims.

What is claimed is:

1. A method of generating a dummy bidirectional predictive picture which can be repeated during display with substantially no vibration, wherein the dummy bidirectional predictive picture contains at least two fields, comprising the steps of:
   setting a parameter of the dummy bidirectional predictive picture to indicate that no encoding of a residual signal will occur; and
   employing field-based prediction to predict the at least two fields of the dummy bidirectional predictive picture.

2. The method according to claim 1, wherein said setting step further comprises setting the parameter of the dummy bidirectional predictive picture to indicate that no discrete cosine transform encoding of the residual signal will occur.

3. The method according to claim 1, wherein the dummy bidirectional predictive picture includes a plurality of macroblocks and each macroblock contains at least a portion of the at least two fields and wherein the parameter is a macroblock parameter.

4. The method according to claim 3, wherein each macroblock contains at least two motion vectors having horizontal and vertical motion components and the method further comprises the step of setting the at least two motion vectors of each macroblock to indicate that the horizontal and vertical motion components will be zero.

5. The method according to claim 1, wherein the dummy bidirectional predictive picture is a one-directional prediction picture.

6. The method according to claim 5, wherein the employing field-based prediction step comprises the step of predicting the at least two fields of the dummy bidirectional predictive picture from a single field associated with a separate digitally encoded non-progressive picture.

7. The method according to claim 5, wherein the dummy bidirectional predictive picture is a forward predicted picture.

8. The method according to claim 5, wherein the bidirectional predictive picture is a backward predicted picture.

9. The method according to claim 6, wherein the separate digitally encoded non-progressive picture is an intra picture.

10. The method according to claim 6, wherein the separate digitally encoded non-progressive picture is a predictive picture.

11. The method according to claim 1, wherein the dummy bidirectional predictive picture is a two directional predicted picture such that a first field of the dummy bidirectional predictive picture is predicted from a first reference picture and a second field of the dummy bidirectional predictive picture is predicted from a second reference picture.

12. The method according to claim 11, wherein the first field of the dummy bidirectional predictive picture is predicted from a single field associated with the first reference picture and the second field of the dummy bidirectional predictive picture is predicted from a single field associated with the second reference picture.

13. The method according to claim 1, wherein the dummy bidirectional predicted picture is predicted from a non-progressive picture.

14. The method according to claim 1, wherein the dummy bidirectional predicted picture is predicted from a progressive picture.

15. The method according to claim 1, wherein the dummy bidirectional picture is predicted from a field picture.

16. A method for generating a dummy bidirectional (B) predictive picture which can be repeated without display vibration, comprising the step of:
establishing the dummy bidirectional predictive picture from at least one picture in a stream of digitally encoded video by adjusting predetermined settings in a picture syntax, wherein the predetermined setting is a frame_pred_frame_dct flag and the frame_pred_frame_dct flag is set to a value of 0.

17. A method for generating a dummy bidirectional (B) predictive picture which can be repeated without display vibration, comprising the step of:
establishing the dummy bidirectional predictive picture from at least one picture in a stream of digitally encoded video by adjusting predetermined settings in a picture syntax, wherein the dummy bidirectional predictive picture is a backward predicted picture and the predetermined settings are motion_vertical_field_select[0][1] and motion_vertical_field_select[1][0] flags, wherein the flags are set to a value of 0 when the dummy bidirectional predictive picture is predicted from a top field of a reference picture and to a value of 1 when predicted from a bottom field of the reference picture.

18. A method for generating a dummy bidirectional (B) predictive picture which can be repeated without display vibration, comprising the step of:
establishing the dummy bidirectional predictive picture from at least one picture in a stream of digitally encoded video by adjusting predetermined settings in a picture syntax, wherein the dummy bidirectional predictive picture is a forward predicted picture and the predetermined settings are motion_vertical_field_select[0][0] and motion_vertical_field_select[1][0] flags, wherein the flags are set to a value of 0 when the dummy bidirectional predictive picture is predicted from a top field of a reference picture and to a value of 1 when predicted from a bottom field of the reference picture.

19. A system for generating a dummy bidirectional predictive picture, wherein the dummy bidirectional predictive picture contains at least two fields, comprising:
a controller for reading data from a storage medium; and
a processor, wherein the processor is programmed to:
set a parameter of the dummy bidirectional predictive picture to indicate that no encoding of a residual signal will occur; and
employ field-based prediction to predict the at least two fields of the dummy bidirectional predictive picture.

20. The system according to claim 19, wherein the processor is further programmed to set the parameter of the dummy bidirectional predictive picture to indicate that no discrete cosine transform encoding of the residual signal will occur.

21. The system according to claim 19, wherein the dummy bidirectional predictive picture includes a plurality of macroblocks and each macroblock contains at least a portion of the at least two fields and wherein the parameter is a macroblock parameter.

22. The system according to claim 21, wherein each macroblock contains at least two motion vectors having horizontal and vertical motion components and the processor is further programmed to set the at least two motion vectors of each macroblock to indicate that the horizontal and vertical motion components will be zero.

23. The system according to claim 19, wherein the dummy bidirectional predictive picture is a one-directional prediction picture.

24. The system according to claim 23, wherein the processor is further programmed to predict the at least two fields of the dummy bidirectional predictive picture from a single field associated with a separate digitally encoded non-progressive picture.

25. The system according to claim 23, wherein the dummy bidirectional predictive picture is a forward predicted picture.

26. The system according to claim 23, wherein the dummy bidirectional predictive picture is a backward predicted picture.

27. The system according to claim 24, wherein the separate digitally encoded non-progressive picture is an intra picture.

28. The system according to claim 24, wherein the separate digitally encoded non-progressive picture is a predictive picture.

29. The system according to claim 19, wherein the dummy bidirectional predictive picture is a two directional predicted picture such that a first field of the dummy bidirectional predictive picture is predicted from a first reference picture and a second field of the dummy bidirectional predictive picture is predicted from a second reference picture.

30. The system according to claim 29, wherein the processor is further programmed to predict the first field of the dummy bidirectional predictive picture from a single field associated with the first reference picture and to predict the second field of the dummy bidirectional predictive picture from a single field associated with the second reference picture.

31. The system according to claim 19, wherein the dummy bidirectional predictive picture is predicted from a non-progressive picture.

32. The system according to claim 19, wherein the dummy bidirectional predictive picture is predicted from a progressive picture.

33. The system according to claim 19, wherein the dummy bidirectional predictive picture is predicted from a field picture.

34. A system for generating a dummy bidirectional (B) predictive picture which can be repeated without display vibration, comprising:
   a processor, wherein the processor is programmed to predict the dummy bidirectional predictive picture from at least one picture in a stream of digitally encoded video by adjusting predetermined settings in a picture syntax, wherein the predetermined setting is a frame_pred_frame_dct flag and the processor is further programmed to set the frame_pred_frame_dct flag to a value of 0.

35. A system for generating a dummy bidirectional (B) predictive picture which can be repeated without display vibration, comprising:
   a processor, wherein the processor is programmed to predict the dummy bidirectional predictive picture from at least one picture in a stream of digitally encoded video by adjusting predetermined settings in a picture syntax, wherein the dummy bidirectional predictive picture is a backward predicted picture and the predetermined settings are motion_vertical_field_select[0][0] and motion_vertical_field_select[1][0] flags, wherein the processor is further programmed to set the flags to a value of 0 when the dummy bidirectional predictive picture is predicted from a top field of a reference picture and to a value of 1 when predicted from a bottom field of the reference picture.

36. A system for generating a dummy bidirectional (B) predictive picture which can be repeated without display vibration, comprising;
   a processor, wherein the processor is programmed to predict the dummy bidirectional predictive picture from at least one picture in a stream of digitally encoded video by adjusting predetermined settings in a picture syntax, wherein the dummy bidirectional predictive picture is a forward predicted picture and the predetermined settings are motion_vertical_field_select[0][0] and motion_vertical_field_select[1][0] flags, wherein the processor is further programmed to set the flags to a value of 0 when the dummy bidirectional predictive picture is predicted from a top field of a reference picture and to a value of 1 when predicted from a bottom field of the reference picture.

* * * * *